Dec. 18, 1962  R. A. AHLBECK ETAL  3,068,511
METHOD AND APPARATUS FOR BLOW MOLDING PLASTIC MATERIAL
Filed Feb. 2, 1961  3 Sheets-Sheet 1
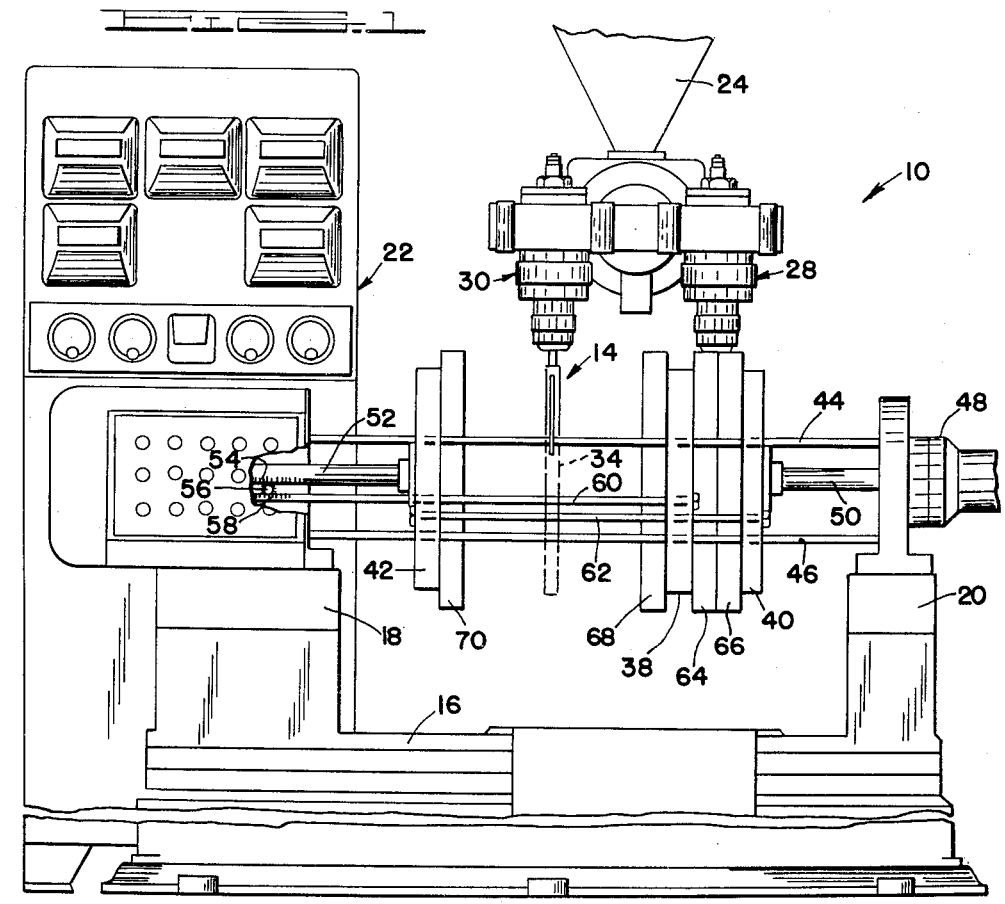
INVENTORS.
RICHARD A. AHLBECK
BY JACK W. SMITH
OLSEN AND STEPHENSON
ATTORNEYS

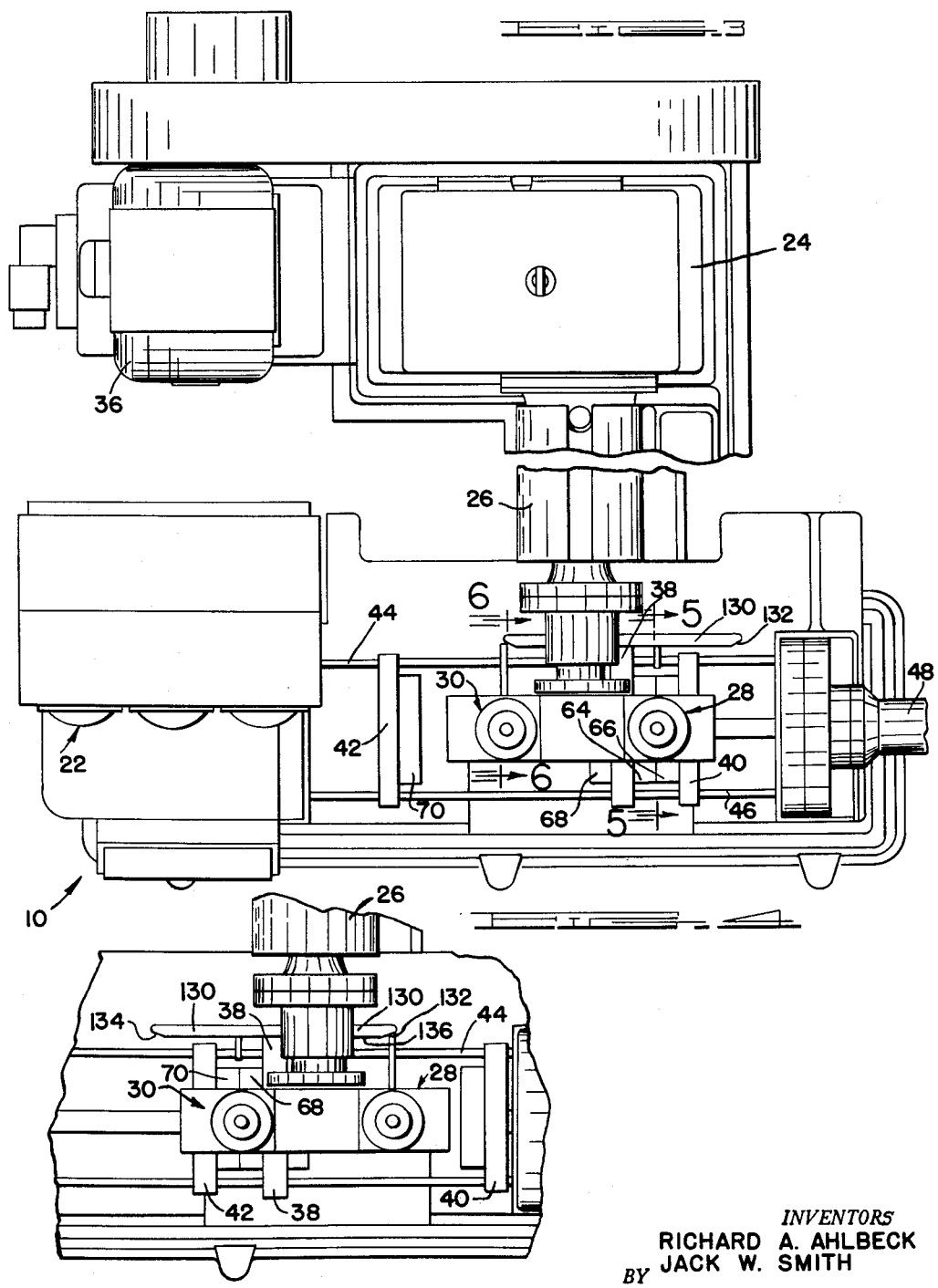

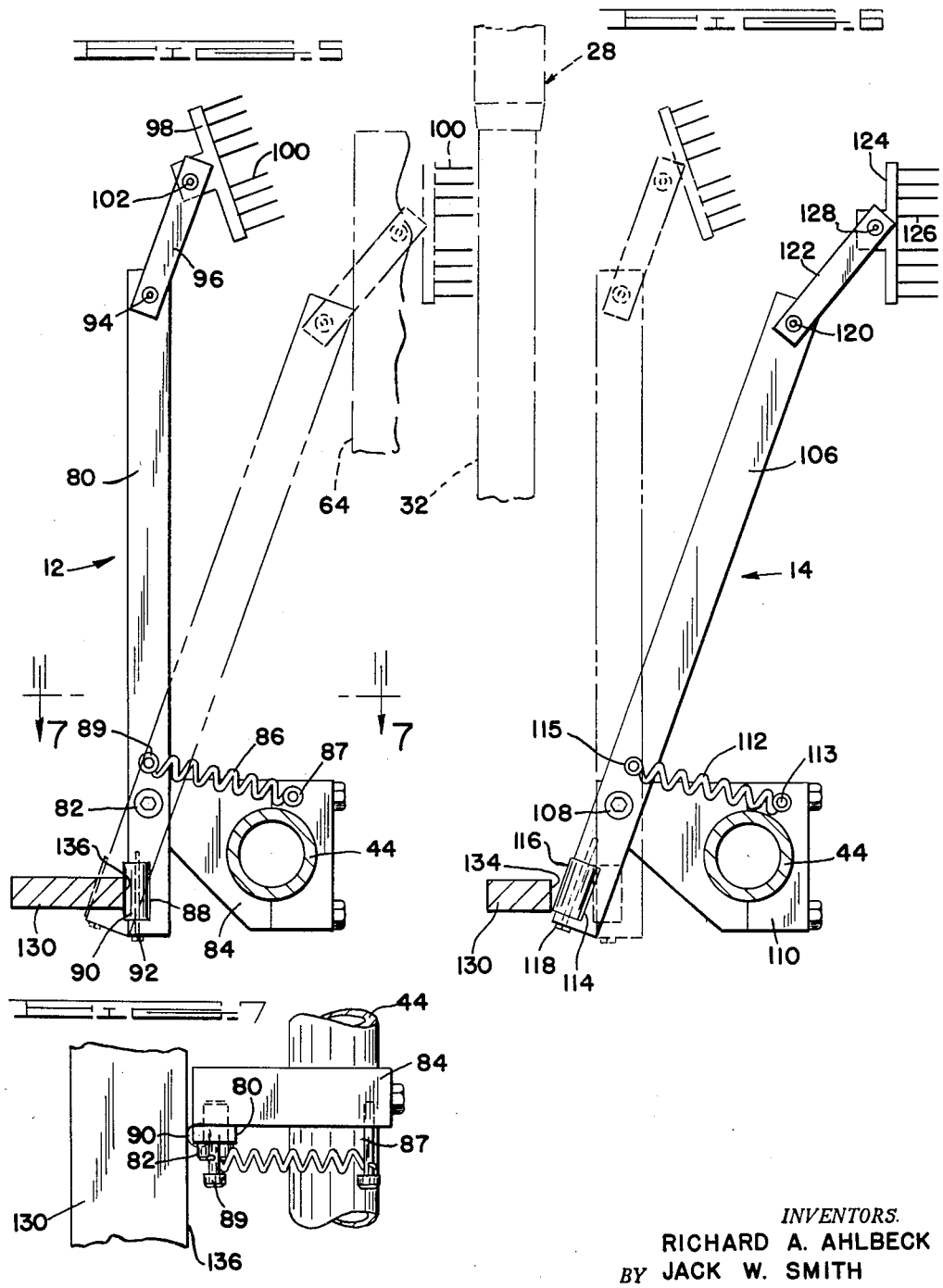

United States Patent Office 3,068,511
Patented Dec. 18, 1962

3,068,511
METHOD AND APPARATUS FOR BLOW MOLDING PLASTIC MATERIAL
Richard Allen Ahlbeck, Milan, and Jack W. Smith, Tecumseh, Mich., assignors to Plas-Tainer Inc., Saline, Mich., a corporation of Michigan
Filed Feb. 2, 1961, Ser. No. 86,792
14 Claims. (Cl. 18—5)

This invention relates generally to apparatus for blow molding thermoplastic resins which are rigid at normal temperatures but which are capable of deformation under the influence of heat and pressure and more particularly to an improved method and apparatus for molding this material so as to avoid the objectionable effects of a static electric charge on the parison during the molding operation.

In the blow molding of plastic materials into hollow shapes, the plastic in bulk and granular form is deposited in a hopper of a blow molding machine. The granular material is heated until it is plastic and is then extruded in a downward direction through an annular die so that a tubular parison of predetermined length is formed which is supported only at its upper end in the machine. The mold parts or sections which determine the shape of the final plastic product are then moved radially inwardly toward the parison to positions in which the mold cavity formed by the mold sections surrounds the parison. Air under pressure is blown into the parison to expand it outwardly against the inner mold walls where the plastic cools and forms the rigid plastic part which is then removed from the machine after the mold sections have been retracted away from the formed part. The bulk material which is supplied to the machine may and usually does carry some electric charge and this material may also be charged when it is extruded through the tubular die. The resulting charge on the parison has objectionable effects, particularly under high humidity conditions in the atmosphere surrounding the parison, on the molding operation in that it sometimes causes the parison to swing, like a pendulum, toward one of the mold parts as the mold is being moved to a position surrounding the parison. The parison first engages one side of the mold causing the parison to cool unevenly and resulting in an uneven distribution of material in the final plastic part, with a consequent warping of the part. The longer the parison is, the greater the moment that tends to swing the parison and therefore the most difficulty of this nature is encountered when molding long thin parts such as baseball bats.

It is an object of this invention, therefore, to provide an improved method and apparatus for blow molding plastic articles in which the parison is grounded so as to eliminate the objectionable electric charge therein. This is accomplished by providing a grounding arm unit in the machine which is moved to a position in close proximity to the parison during formation thereof and is mounted on the mold supporting frame. The arm moves out of the path of the mold sections after the parison has been fully formed and before the mold sections have been advanced into positions surrounding the parison.

A further object of this invention is to provide a blow molding machine of the type having a pair of alternately operating side-by-side extrusions dies with a pair of parison grounding devices, one for each die, which are operated by a cam controlled by movement of the mold sections corresponding to the dies, so that when plastic is being extruded through each die to form a parison, the grounding device corresponding to the die is in a position to ground the parison.

Further objects, features and advantages of this invention will become apparent from a consideration of the following description, the appended claims, and the accompanying drawing in which:

FIGURE 1 is a front elevational view of a two mold blow molding machine equipped with the grounding device of this invention, showing the machine in a position in which one of the molds is closed and the other mold is open for removal of a formed article;

FIGURE 2 is a fragmentary front elevational view of the machine shown in FIG. 1, showing the machine in a moved position from that shown in FIG. 1 so that the one mold is open and the other mold is closed;

FIGURE 3 is a plan view of the machine of this invention in the position illustrated in FIG. 1;

FIGURE 4 is a fragmentary plan view showing a portion of the machine of this invention in the position illustrated in FIG. 2;

FIGURE 5 is a fragmentary sectional view looking substantially along the line 5—5 in FIG. 3 and illustrating the grounding device corresponding to one of the molds in a retracted position in full lines and in an operative position in broken lines;

FIGURE 6 is a fragmentary sectional view looking substantially along the line 6—6 in FIG. 3, illustrating the grounding device corresponding to the other mold in an operative position in full lines and in a retracted position in broken lines; and FIGURE 7 is a sectional view of a grounding arm unit as seen from the line 7—7 in FIG. 5.

With reference to the drawing, a blow molding machine, indicated generally at 10, is illustrated in FIGS. 1 and 2, provided with a pair of grounding arm units 12 and 14 of this invention. The machine 10 includes a base or main frame 16 having spaced upstanding side portions 18 and 20, and a control assembly 22 mounted on the side portion 18. The machine 10 also includes the usual hopper 24 (FIG. 3) into which bulk plastic material to be molded is loaded, and an extruder 26 which communicates with the hopper 24 and in which the plastic material is heated and conveyed to a pair of side-by-side die heads 28 and 30. Each of the heads 28 and 30 includes a die (not shown) having an annular opening, and the machine 10 operates automatically in a well known manner to extrude plastic from the extruder 26 downwardly through first one head 28 and then the other head 30 so as to first form a downwardly extending tubular parison 32 of a predetermined length at the head 12, and then a tubular parison 34 of predetermined length at the head 30. While the parison 32 is being extruded at the head 28, (FIG. 2) the machine 10 is operating to blow air into the parison 34 so as to form the desired plastic product from the plasitc extending downwardly from the head 30, and while the parison 34 is being formed at the head 30 (FIG. 1) the machine 10 operates to inject air into the parison 32 so as to form the desired final plastic product from the plastic material depending from the head 28, all in the manner well known in the art. A motor 36 (FIG. 3) mounted adjacent the hopper 24 provides the power for operating the extruder 26.

The machine 10 also includes a center platen 38 and two end platens 40 and 42 which are slidably mounted on guide or tie bars such as the ones indicated at 44 and 46 which extend between the frame side portions 18 and 20 at a position below the die heads 28 and 30. A fluid actuated cylinder assembly 48, mounted on the frame side portions 20, has a piston rod 50 which is secured to the end platen 40. A rod 52 secured to the opposite end platen 42 is guidably mounted in the frame side portion 18 and is provided with rack teeth which mesh with the teeth on a gear 56 rotatably mounted on the frame side portion 18. The gear 56 also meshes with rack teeth 58 on a rod 60 which is connected to the center platen 38.

A rod 62 connects the end platens 40 and 42 so that they are maintained in a predetermined spaced relation.

A mold section 64 is secured to one side of the center platen 38 and a cooperating mold section 66 is secured to the end platen 40. When the mold sections 64 and 66 are moved into clamping engagement, as illustrated in FIGS. 1 and 3, they cooperate to form a mold cavity which surrounds a parison 32 depending from the die head 28. A mold section 68 is secured to the opposite side of the center platen 38 and a cooperating mold section 70 is secured to the end platen 42. When the mold sections 68 and 70 are moved into clamping engagement as shown in FIGS. 2 and 4, they cooperate to form a mold cavity which surrounds a parison 34 depending from the die head 30. As shown in FIG. 1, when the mold sections 64 and 66 for a parison 32 are engaged to form a mold cavity the mold sections 68 and 70 are moved apart so as to open the mold cavity formed thereby. Similarly, when the mold sections 68 and 70 are engaged to form a mold cavity surrounding a parison 34, the mold sections 64 and 66 are moved apart to open the mold cavity defined thereby, as shown in FIG. 2.

The cylinder assembly 48 operates in a timed relation with the valve assembly or the like (not shown) which alternately directs the flow of plastic from the extruder 26 to the die heads 28 and 30 so as to move the platens 38, 40 and 42 such that on the completion of the formation of the parison 32 the mold sections 64 and 66 are moved into engagement so that the mold cavity formed thereby surrounds the parison 32. When the parison 32 is completed the valve assembly directs plastic from the extruder 26 to the die head 30 so that the parison 34 is formed at the die head 30. When the parison 34 has been completely formed, the cylinder assembly 48 has operated to move the mold sections 68 and 70 into engagement as shown in FIG. 2 so that air can be discharged into the parison 34 to expand it into engagement with the walls of the surrounding mold cavity. While the mold sections 64 and 66 are being moved apart to the position shown in FIG. 2, the completed plastic article formed from the parison 32 is removed from the machine 10 prior to the extrusion of the next parison 32 while the parison 34 is being expanded.

As shown in FIGS. 3 and 5, when the mold sections 64 and 66 are engaged, the arm unit 12 is in an upright position to one side of the mold sections and as shown in FIGS. 3 and 6, the arm unit 14 is in inclined position for grounding the parison 34 being formed at this time at the head 30. The arm unit (FIGS. 5 and 7), which is formed entirely of metal consists of an elongated bar 80 which is pivotally mounted adjacent its lower end on a pivot assembly 82 carried by a mounting block 84 clamped to the tie bar 44. The bar 80 is in substantially horizontal alignment with the parison 32 and a spring 86 which extends between a pin 87 carried by the mounting block 84 and a pin 89 secured to the bar 80 at a position above the pivot assembly 82 urges the bar 80 in a clockwise direction as viewed in FIG. 5. The lower end of the bar 80 is formed in one side with a notch 88 and a roller or follower 90 is positioned in the notch 88 and rotatably mounted on a pin 92 carried by the bar 80. A smaller bar 96 is secured by a bolt 94 to the upper end of the bar 80 so that it extends upwardly at an angle to the bar 80. A comb member 98, having a plurality of vertically spaced teeth or fingers 100, is secured by a bolt 102 to the upper end of the bar 96. As shown in FIG. 5 when the arm unit is swung downwardly from its retracted position shown in full lines to its operative position shown in broken lines, the comb teeth or fingers 100 are substantially horizontal and are spaced vertically at a position immediately below and adjacent to the head 28. Consequently, the fingers 100 are in positions such that as the parison 32 is being formed it moves downwardly past the fingers 100 and is at all times in close proximity to the fingers 100. This arrangement provides for a flow of electrons between the parison 32 and the teeth 100 which are through the arm unit 12 when the parison 32 is charged so as to eliminate objectionable static eletric charge in the parison 32.

The arm unit 14 is substantially identical to the unit 12 and is also formed entirely of metal. The unit 14 consists of an elongated bar 106 which is pivotally mounted adjacent its lower end on a pivot assembly 108 carried by a mounting block 110 clamped to the tie bar 44 at a position such that the bar 106 is in substantially horizontal alignment with the parison 34. A spring 112 extends between a pin 113 secured to the block 110 and a pin 115 secured to the bar 106 at a position above the pivot assembly 108 so that the spring 112 normally urges the bar 106 in a clockwise direction as viewed in FIG. 6. The lower end of the bar 106 has a notch 114 in one side and a roller 116 is positioned in the notch 114 and rotatably supported on a pin 118 carried by the bar 106. A bolt 120 connects a smaller bar 122 to the upper end of the bar 106 so that the bar 122 extends upwardly at an angle to the bar 106. A comb member 124 having a plurality of teeth or fingers 126 is secured by a bolt 128 to the upper end of the bar 122. The arm unit 14 is movable, like the unit 12 between a retracted position, shown in broken lines in FIG. 6, and an operative position, shown in full lines, in which the fingers 126 are positioned relative to the parison 34 like the position of the fingers 100 relative to the parison 32 shown in FIG. 5.

An elongated cam bar 130 is secured intermediate its ends to the center platen 38 and is formed at its ends with inclined end surfaces 132. An edge surface 136 on the cam 130 extends between the end surfaces 132 and 134 and is positioned so that it is engageable with the cam followers or rollers 90 and 116 in the units 12 and 14 as shown in FIGS. 3, 4 and 5. When the center platen 38 is in the position illustrated in FIGS. 1 and 3, the follower 90 in the unit 12 is engaged by the cam edge surface 136 so that the cam 130 functions to maintain the arm unit 12 in its retracted position shown in FIG. 5 in which it is to one side of the mold sections 64 and 66. In this position of the cam member 130, the follower 116 is maintained in engagement with the cam end surface 134 by the spring 112 so that the arm unit 14 is in its operative position shown in full lines in FIG. 6 for grounding a parison 34 as the parison is formed. When the cylinder assembly 48 is operated to retract the piston rod 50 and move the center platen 38 toward the end platen 42, the cam 130 is moved toward the left as viewed in FIG. 3 so that the follower 116 rides on the inclined end surface 134 onto the edge surface 136 so that the cam 130 functions to move the unit 14 from its operative position to its retracted position against the pressure of the spring 112. The arm unit 14 in its retracted position is out of the path of the mold sections 68 and 70 so that these sections are movable into engagement as shown in FIG. 4 without interference from the arm unit 14. As the center platen 38 approaches the position shown in FIG. 4, the spring 86 acts to move the follower 90 along the inclined cam end surface 132 so that the arm unit 12 is moved to its operative position shown in broken lines in FIG. 5 for grounding the parison 32 as it is extruded from the die head 28. When the cylinder assembly 48 is operated to extend the piston rod 50, the center platen 38 is moved toward the right as viewed in FIG. 4 so that the cam 130 acts on the follower 90 to move it along the end surface 132 onto the edge surface 136 to move the unit 12 out of the path of the mold sections 64 and 66 prior to movement of the mold sections into engagement with each other. As the center platen 38 approaches its position shown in FIG. 3, the spring 112 moves the arm 106 so that the follower 116 rides off the edge surface 136 onto the end surface 134 so as to move the arm unit 14 into its operative position shown in FIG. 6 for grounding the parison 34 as it is extruded from the die head 30. The followers 90 and 116 are at all times in engagement with the cam 130 so that the position of the cam 130 determines the positions of the arm units 12 and 14.

It can thus be seen that the cam 130 coacts with the followers 90 and 116 on the arm units 12 and 14 to provide for automatic movement of the units 12 and 14 between retracted and operative positions as the cavity defining mold sections 64, 66, 68 and 70 are moved between cavity forming and open positions. Whenever a parison 32 is being extruded through the die head 28, the arm unit is in position for grounding the parison, and whenever the parison 34 is being extruded from the die head 30, the arm unit 14 is in a position to ground the parison.

It will be understood that the specific method and apparatus for blow molding plastic material which are herein disclosed and described are presented for purposes of explanation and illustration and are not intended to indicate limits of the invention, the scope of which is defined by the following claims.

What is claimed is:

1. In the manufacture of blown hollow articles from plastic materials in which an upright tubular parison supported only at its upper end is blown into conformity with a surrounding mold cavity, the process which includes grounding said parison at a position spaced below the upper end thereof and thereafter blowing the parison.

2. In the manufacture of blown hollow articles from plastic material in which a machine is provided having an extrusion nozzle and mold sections are mounted below said nozzle for horizontal movement to closed positions defining a mold cavity, and said material is extruded downwardly through said nozzle to form a downwardly extending tubular body of said material suspended between said mold sections so that on closing thereof said body is substantially enclosed within said mold cavity, the process comprising grounding said body at a position below said nozzle during formation of said body and prior to enclosing of said body in said cavity, and thereafter blowing said body into conformity with said surrounding mold cavity.

3. In apparatus for forming blown hollow articles from plastic materials wherein said apparatus includes a frame, means on said frame for forming a downwardly extending tubular body of blowable plastic material, and mold means movably mounted on said frame for movement to a position defining a mold cavity which substantially surrounds said body; a grounding member mounted on said frame and movable to a position in close proximity to said body.

4. In a blow-molding machine which includes a frame, an extrusion die for forming a downwardly extending parison of blowable plastic material, and a plurality of mold sections mounted on said frame for substantially horizontal relative movement to positions defining a mold cavity which substantially surrounds said parison; a parison grounding member formed of a material capable of conducting an electric current, and means mounting said grounding member on said frame in electrical contact therewith for horizontal movement between a position in close proximity to said parison and a position to one side of said mold sections when they are in said cavity defining positions.

5. The apparatus of claim 4 wherein said grounding member is comprised of an arm having a plurality of fingers mounted on one end thereof and positioned in close proximity to said parison in said first mentioned position of said grounding member.

6. The apparatus of claim 4 wherein said grounding member is comprising of an arm having one end pivotally mounted on said frame and a plurality of fingers mounted on the opposite end and projected toward said parison into close proximity thereto in said first mentioned position of said grounding member.

7. In blow molding apparatus which includes means for forming a downwardly extending parison of blowable plastic material, and a plurality of mold sections mounted for substantially horizontal movement to positions defining a mold cavity which substantially surrounds said parison; an arm member pivotally mounted for swinging movement in a substantially vertical plane between a first position in close proximity to said parison for electrically connecting it to ground and a second position to one side of said mold sections in said positions thereof defining said mold cavity, means urging said arm toward one of said positions, and means including a cam member connected to one of said movable mold sections for moving said arm toward the other one of said positions.

8. In blow molding apparatus which includes means for forming a downwardly extending parison of blowable plastic material, and a plurality of mold sections mounted for substantially horizontal movement to positions defining a mold cavity which substantially surrounds said parison; an arm member pivotally mounted for swinging movement in a substantially vertical plane between a first position in close proximity to said parison for electrically connecting it to ground and a second position to one side of said mold sections in said positions thereof defining said mold cavity, means urging said arm toward one of said positions, and coacting cam and cam follower means connected to one of said movable mold sections and said arm for moving said arm toward the other one of said positions.

9. In blow molding apparatus which includes means for forming a downwardly extending parison of blowable plastic material, and a plurality of mold sections mounted for substantially horizontal movement to positions defining a mold cavity which substantially surrounds said parison; an arm member pivotally mounted for swinging movement in a substantially vertical plane between a first position in close proximity to said parison for electrically connecting it to ground and a second position to one side of said mold sections in said positions thereof defining said mold cavity, means urging said arm toward one of said positions, and coacting cam and cam follower means connected to one of said movable mold sections and said arm, respectively, for moving said arm toward the other one of said positions.

10. In a blow molding machine which includes a pair of side-by-side extrusion dies for alternately forming parisons of blowable plastic material extending downwardly from said dies, a frame, a plurality of mold sections mounted on said frame below each of said dies for movement to positions defining a mold cavity substantially surrounding a parison extending downwardly from said die, and means for moving said mold sections so that when the sections below one of said dies are in cavity forming positions the sections below the other die are in positions spaced horizontally from each other; a pair of parison grounding arms corresponding to and positioned below said dies for electrically grounding said dies, each of said arms being pivotally mounted at one end on said frame so that the opposite end thereof is movable between a first position in close proximity to a parison depending from the corresponding die and a second position to one side of the mold sections surrounding said parison, cam means mounted on one of said movable mold sections, cam followers on said arms engaged with said cam means so that when a plurality of said mold sections are in a position surrounding the parison from one of said dies the arm corresponding to said one die is moved to said second position therefor by said cam means, and spring means urging the other arm to said one position when said one arm is in said second position.

11. In a blow molding machine which includes a pair of side-by-side extrusion dies for alternately forming parisons of blowable plastic material extending downwardly from said dies, a frame, a plurality of mold sections mounted on said frame below each of said dies for movement to positions defining a mold cavity substantially surrounding a parison extending downwardly from said die, and means for moving said mold sections so that when the sections below one of said die are in cavity forming positions the sections below the other die are in positions spaced horizontally from each other; a pair of parison grounding arm units corresponding to and positioned below said dies for electrically grounding said dies, each of said arm units being pivotally mounted at one end on said frame so that the opposite end thereof is movable between a first position in close proximity to a parison depending from the corresponding die and a second position to one side of the mold sections surrounding said parison, a cam member mounted on one of said movable mold sections, cam followers on said arms engaged with said cam member so that when a plurality of mold sections are in a position surrounding the parison from one of said dies the arm unit corresponding to said one die is moved to said second position therefor by said cam member, and spring means urging the other arm to said one position when said one arm is in said second position, each of said arms units including a comb member at the opposite end thereof.

12. In a blow-molding machine which includes a frame, an extrusion die for forming a downwardly extending parison of blowable plastic material, and a plurality of mold sections mounted on said frame for substantially horizontal relative movement to positions defining a mold cavity which substantially surrounds said parison; a parison grounding unit formed of a material capable of conducting an electric current, means forming a plurality of current conducting fingers on one end of said unit, and means mounting the opposite end of said grounding unit on said frame in electrical contact therewith for movement of said fingers between vertically spaced positions in close proximity to said parison and positions to one side of said mold sections when they are in said cavity defining positions.

13. In a blow-molding machine which includes a frame, means for forming a downwardly extending parison of blowable plastic material, and a plurality of mold sections mounted on said frame for substantially horizontal relative movement to positions defining a mold cavity which substantially surrounds said parison; a parison grounding member formed of a material capable of conducting an electric current, and means pivotally mounting said grounding member on said frame in electrical contact therewith for pivotal movement between a position in close proximity to said parison and a position to one side of said mold sections when they are in said cavity defining positions.

14. In a blow-molding machine which includes a frame, tie bar means on said frame, means for forming a downwardly extending parison of blowable plastic material, and a plurality of mold sections mounted on said tie bar means for substantially horizontal relative movement to positions defining a mold cavity which substantially surrounds said parison; a parison grounding member formed of a material capable of conducting an electric current, and means pivotally mounting said grounding member on said tie bar means in electrical contact therewith for pivotal movement between a position in close proximity to said parison and a position to one side of said mold sections when they are in said cavity defining positions.

References Cited in the file of this patent
UNITED STATES PATENTS

| | | |
|---|---|---|
| 2,449,972 | Beach | Sept. 28, 1948 |
| 2,724,860 | Strong | Nov. 29, 1955 |
| 2,744,212 | Baum | May 1, 1956 |
| 2,883,190 | Manthey | Apr. 21, 1959 |

FOREIGN PATENTS

| | | |
|---|---|---|
| 1,183,933 | France | July 15, 1959 |
| 570,281 | Italy | Dec. 5, 1957 |